(12) United States Patent
Anderson

(10) Patent No.: US 12,294,205 B2
(45) Date of Patent: *May 6, 2025

(54) IN-DECK CONDUIT FOR CONCRETE DECKS

(71) Applicant: ERICO International Corporation, Solon, OH (US)

(72) Inventor: Scott Ernest Anderson, Garrettsville, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,751

(22) Filed: Mar. 15, 2024

(65) Prior Publication Data
US 2024/0222947 A1    Jul. 4, 2024

Related U.S. Application Data

(63) Continuation of application No. 18/061,960, filed on Dec. 5, 2022, now Pat. No. 11,962,134.

(60) Provisional application No. 63/287,357, filed on Dec. 8, 2021.

(51) Int. Cl.
*H02G 3/04* (2006.01)

(52) U.S. Cl.
CPC .................. *H02G 3/0406* (2013.01)

(58) Field of Classification Search
None
See application file for complete search history.

(56) References Cited

U.S. PATENT DOCUMENTS

| | | |
|---|---|---|
| 1,785,985 A | 12/1930 | Shrum |
| 1,906,093 A | 4/1933 | Ponce |
| 3,471,987 A | 10/1969 | Yelsma |
| 4,433,821 A | 2/1984 | Bolding et al. |
| 5,150,930 A | 9/1992 | Petty et al. |
| D332,481 S | 1/1993 | Petty et al. |
| 5,285,013 A | 2/1994 | Schnell et al. |
| 5,332,270 A | 7/1994 | Petty et al. |
| 5,762,300 A | 6/1998 | Sorkin |
| 6,123,366 A | 9/2000 | Kiriakopolos et al. |
| D474,750 S | 5/2003 | Dyer et al. |
| 6,916,014 B1 | 7/2005 | Thomas |
| D544,448 S | 6/2007 | Hull et al. |
| D549,661 S | 8/2007 | Hull et al. |
| 7,312,407 B2 | 12/2007 | Case |
| 7,387,288 B2 | 6/2008 | Hull et al. |

(Continued)

FOREIGN PATENT DOCUMENTS

| | | |
|---|---|---|
| AT | 13134 U1 | 7/2013 |
| CA | 2986997 A1 | 5/2019 |

(Continued)

*Primary Examiner* — Krystal Robinson
(74) *Attorney, Agent, or Firm* — Quarles & Brady LLP

(57) ABSTRACT

An in-deck conduit for installation on a form for a concrete deck can provide a passage for wiring or other components within the concrete deck. The in-deck conduit can have a body with a base end, a deck end, and an internal passage extending from the base end to the deck end. One or more support legs can extend from the deck end of the body laterally relative to the passage to support the body on the form.

20 Claims, 15 Drawing Sheets

(56) References Cited

U.S. PATENT DOCUMENTS

| | | | |
|---|---|---|---|
| 7,527,225 B1 * | 5/2009 | Schulz | F16L 3/1226 |
| | | | 248/65 |
| 7,596,913 B2 | 10/2009 | Carew | |
| 7,635,009 B1 | 12/2009 | Carew et al. | |
| 7,849,886 B2 | 12/2010 | Carew et al. | |
| 7,973,250 B2 | 7/2011 | Groeller et al. | |
| 8,563,878 B2 | 10/2013 | Suzuki | |
| D719,527 S | 12/2014 | Kim | |
| D720,836 S * | 1/2015 | Moe | D23/260 |
| 9,566,740 B2 | 2/2017 | Valola et al. | |
| D832,221 S | 10/2018 | Baldwin | |
| 10,274,111 B2 | 4/2019 | Breda | |
| 10,309,570 B2 | 6/2019 | Gonzalez Bayon et al. | |
| 10,312,672 B2 | 6/2019 | Baldwin | |
| 10,320,167 B2 | 6/2019 | Krause | |
| 10,443,728 B1 * | 10/2019 | Oman | F16L 15/008 |
| 10,488,077 B2 | 11/2019 | Vargo et al. | |
| 10,742,008 B2 | 8/2020 | Krause | |
| 10,989,334 B2 | 4/2021 | Cosley et al. | |
| 11,035,500 B2 * | 6/2021 | O'Neil | F16L 33/02 |
| 11,221,090 B2 | 1/2022 | Krause | |
| 11,781,677 B2 | 10/2023 | Cosley et al. | |
| 11,962,134 B2 | 4/2024 | Anderson | |
| 2006/0022456 A1 | 2/2006 | Hull et al. | |
| 2006/0267338 A1 | 11/2006 | Hull et al. | |
| 2006/0272243 A1 | 12/2006 | Carew et al. | |
| 2008/0093843 A1 | 4/2008 | Noroozi et al. | |
| 2009/0320950 A1 | 12/2009 | Carew et al. | |
| 2012/0248764 A1 * | 10/2012 | Ericksen | F16L 17/00 |
| | | | 285/331 |
| 2018/0231146 A1 * | 8/2018 | O'Neil | E04G 21/185 |
| 2019/0128446 A1 | 5/2019 | Harms | |
| 2019/0207371 A1 | 7/2019 | Krause | |
| 2020/0406498 A1 | 12/2020 | Niimi et al. | |
| 2021/0246603 A1 | 8/2021 | Kenny et al. | |
| 2021/0285570 A1 | 9/2021 | Cosley et al. | |

FOREIGN PATENT DOCUMENTS

| | | |
|---|---|---|
| CN | 202691413 U | 1/2013 |
| CN | 209469875 U | 10/2019 |
| CN | 214466996 U | 10/2021 |
| DE | 8913648 U1 | 1/1990 |
| DE | 19829319 A1 | 11/1999 |
| DE | 102014104334 A1 | 10/2015 |
| EP | 1008813 A1 | 6/2000 |
| EP | 1953439 A2 | 8/2008 |
| EP | 2189695 B1 | 10/2011 |
| EP | 3026766 B1 | 12/2023 |
| JP | 3278583 B2 | 4/2002 |
| KR | 1918856 B1 | 11/2018 |
| WO | 2005/080846 A1 | 9/2005 |

* cited by examiner

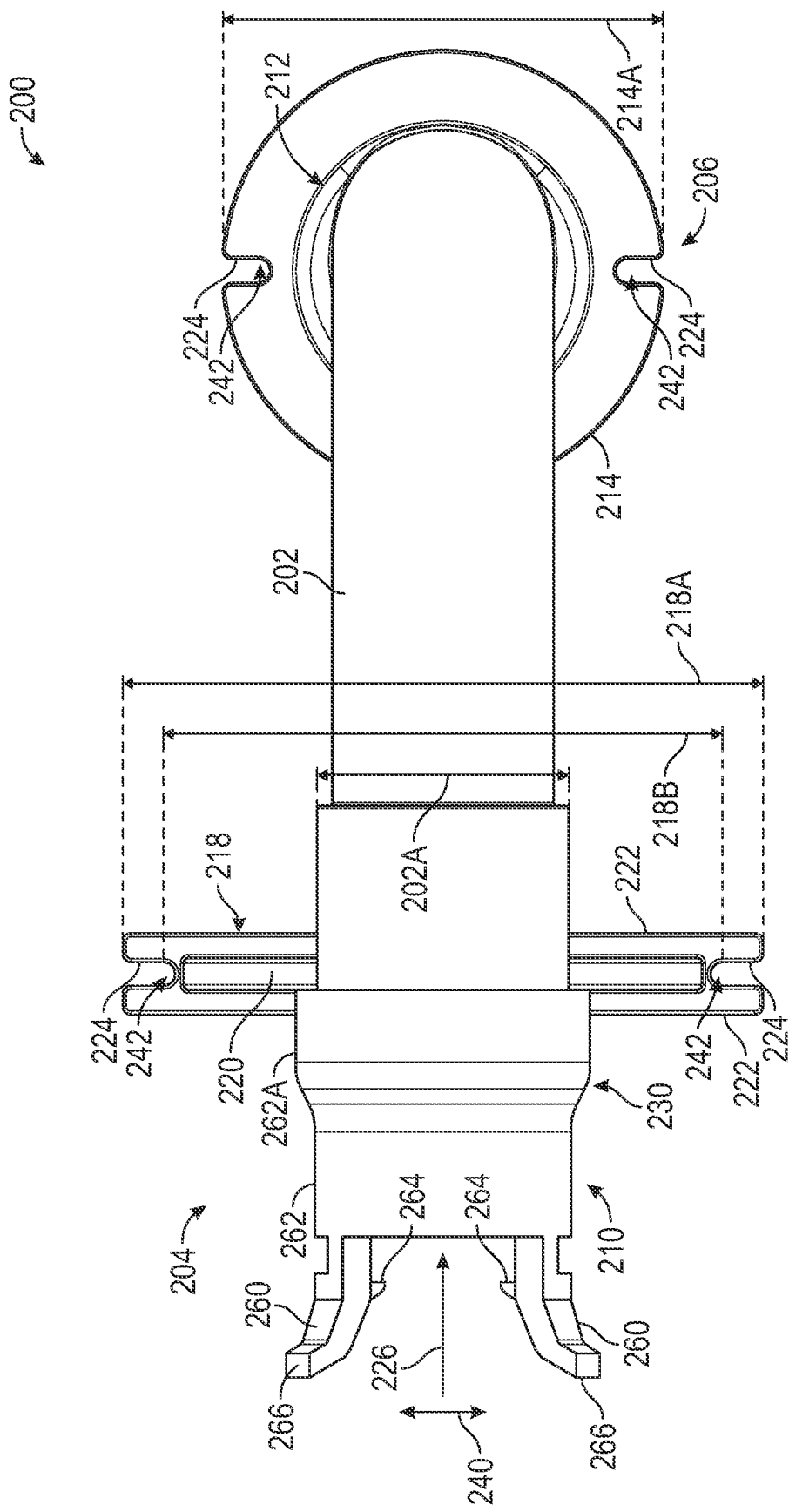

IN-DECK CONDUIT FOR CONCRETE DECKS

CROSS REFERENCE TO RELATED APPLICATIONS

The present application is a continuation application of U.S. non-provisional application Ser. No. 18/061,960, filed on Dec. 5, 2022, which claims priority to U.S. provisional application No. 63/287,357, filed Dec. 8, 2021, the entireties of which are incorporated herein by reference.

BACKGROUND

The present disclosure relates generally to conduits for wires or other devices, including to provide in-deck (e.g., through-deck) routing relative to a concrete deck.

In-deck conduits can provide passages within concrete decks for electrical wiring or other components. In some approaches, an in-deck conduit can be placed into position on a plywood mold and concrete can be poured around the conduit so that the in-deck conduit provides a passage within the concrete deck once the concrete has set.

SUMMARY

An in-deck conduit, as described herein, may have various configurations. In some embodiments, the in-deck conduit is a curved conduit. In some embodiments, the in-deck conduit is an angled conduit.

In some embodiments, an in-deck conduit can be provided for installation on a form for a concrete deck, to provide a passage for wiring or other components within the concrete deck. A body can include a base end that defines an entrance, a deck end that defines an exit, and an internal passage extending between the base end and the deck end. The entrance can be oriented to receive wiring into the internal passage in a substantially horizontal entrance direction at the deck end. The exit can be oriented to direct the received wiring out of the internal passage in a substantially vertical exit direction at the base end. The body can define an internal shoulder between the internal passage and the exit so that the exit is wider than the internal passage.

A base flange can integrally extend from the base end of the body to support the body on a form for a concrete deck. The base flange can have a base flange width that is larger than a width of the body in a lateral direction, relative to the entrance direction.

A leg structure can integrally extend from the deck end of the body to further support the body on the form. The leg structure can provide a first support location and a second support location that are spaced laterally away from the entrance to define a support width that is wider than the base flange width.

In some embodiments, an in-deck conduit can include a body with a base end that defines a first opening, a deck end that defines a second opening, and an internal passage extending between the base end and the deck end. The first opening can be oriented to receive wiring into the internal passage in a first direction at the deck end and the second opening can be oriented to direct the received wiring out of the internal passage in a second direction at the base end. A base flange at the base end of the body can be configured to support the body on a form for a concrete deck, and can have a base flange width in a lateral direction, relative to the first direction. One or more support legs can extend from the deck end of the body in the lateral direction to support the body on the form at a first leg location and a second leg location. The first and second leg locations can be spaced away from the first opening to define a support width in the lateral direction that is larger than the base flange width.

In some embodiments, an in-deck conduit can include a body with a base end, a deck end, and an internal passage extending between an entrance to the body at the deck end and an exit from the body at the base end, the body having a first width in a lateral direction, relative to the internal passage. A base flange can be integrally formed at the base end of the body to support the body relative to the form. The base flange can have a second width in the lateral direction that is larger than the first lateral width. A leg structure can be integrally formed at the deck end of the body to support the body relative to the form. The leg structure can have a third width in the lateral direction that is larger than the first lateral width. A first arm and a second arm can be cantilevered relative to the body at the deck end and can include, respectively: a catch that extends laterally inward relative an entrance direction into the entrance at the deck end, and a release tab that extends laterally outward relative to the entrance direction.

Other aspects of an in-deck conduit, including other features and advantages thereof, will become apparent to one of ordinary skill in the art upon examination of the figures and detailed description herein.

BRIEF DESCRIPTION OF THE DRAWINGS

FIGS. 9 and 10 are side elevation and top plan views of the in-deck conduit of FIG. 8.

DETAILED DESCRIPTION OF THE DRAWINGS

The following discussion and accompanying figures disclose various embodiments or configurations of a conduit to enclose wires or other similar objects. Although embodiments of a conduit are disclosed with reference to particular installation context of in-deck conduits for concrete decks, the concepts disclosed below for supported conduits may be applied to a wide range of applications.

As generally noted above, it can be useful to provide structures that can guide wiring or other components within (e.g., fully through a thickness of) a concrete deck after the concrete has been poured and set. For example, known stub and other conduits can be installed on a form for a deck so that concrete for the deck can be poured around the conduits and the conduits can thus provide a passage within the deck for use after the concrete has set and the form has been removed. However, conventional in-deck conduit designs can be vulnerable to damage and misplacement, including due to a lack of support prior to the setting of the relevant concrete deck. For example, elevated (deck) ends of conventional conducts are often susceptible to being stepped on, backed into, or otherwise inadvertently engaged and to thereby being misaligned or fully pulled out of an installed position. Thus, there is a need in the art for a solution to provide a more stable and user-friendly installation of stub downs.

Some embodiments of the invention can address these or other issues. For example, some embodiments can include an in-deck conduit with one or more laterally extending support legs. The support leg(s) can provide improved stability during installation, as compared to conventional designs, including as may reduce the likelihood of inadvertent displacement or damage of the conduit. As another example, some embodiments can include improved retention features to engage corrugated (or other) tubing or can include internal passages with improved configurations for wiring or other devices. For example, some embodiments can include internal passages that exhibit relatively large radii of curvature or only bends of relatively small angles, as can improve the ability of users to thread wiring or other components through the conduit after the relevant concrete deck has been set (or otherwise).

Figure 1:
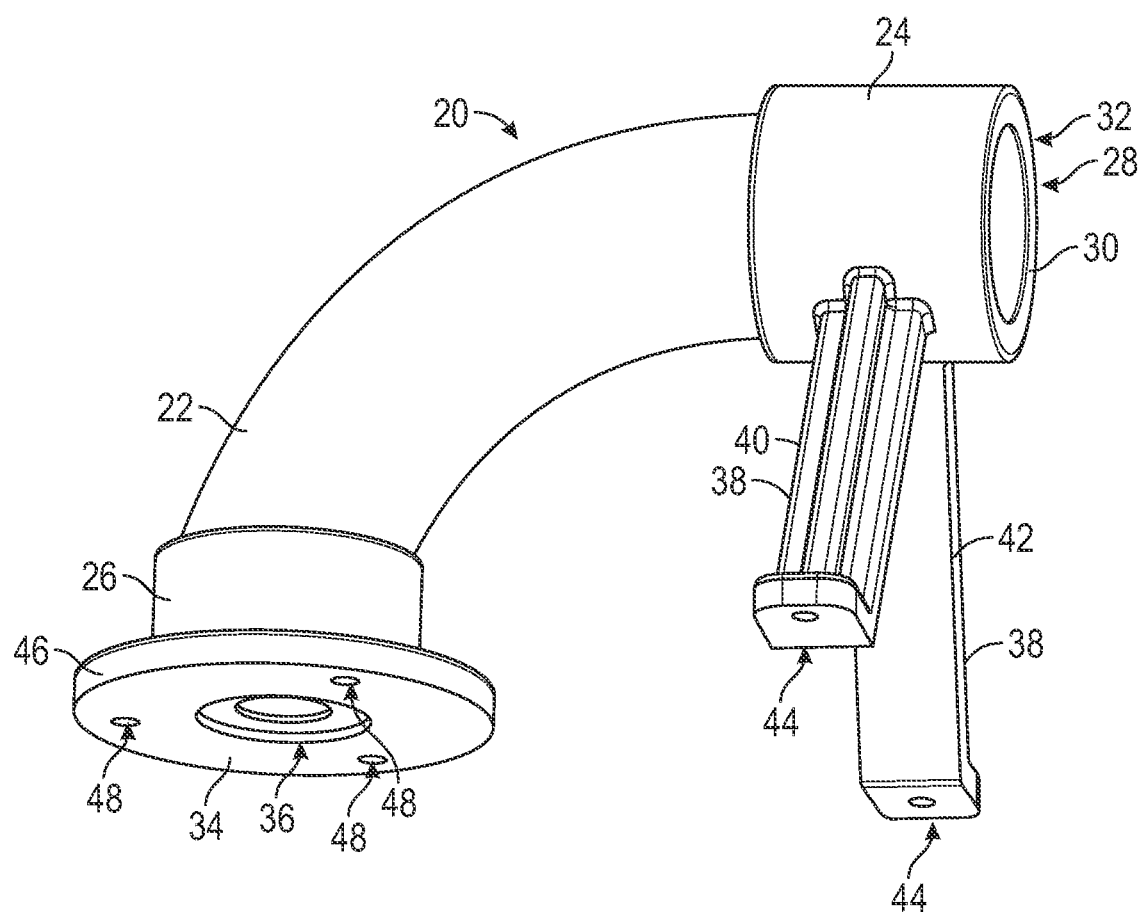
FIG. 1 is an isometric view of a curved in-deck conduit according to an example of the disclosed technology.
Figure 2:
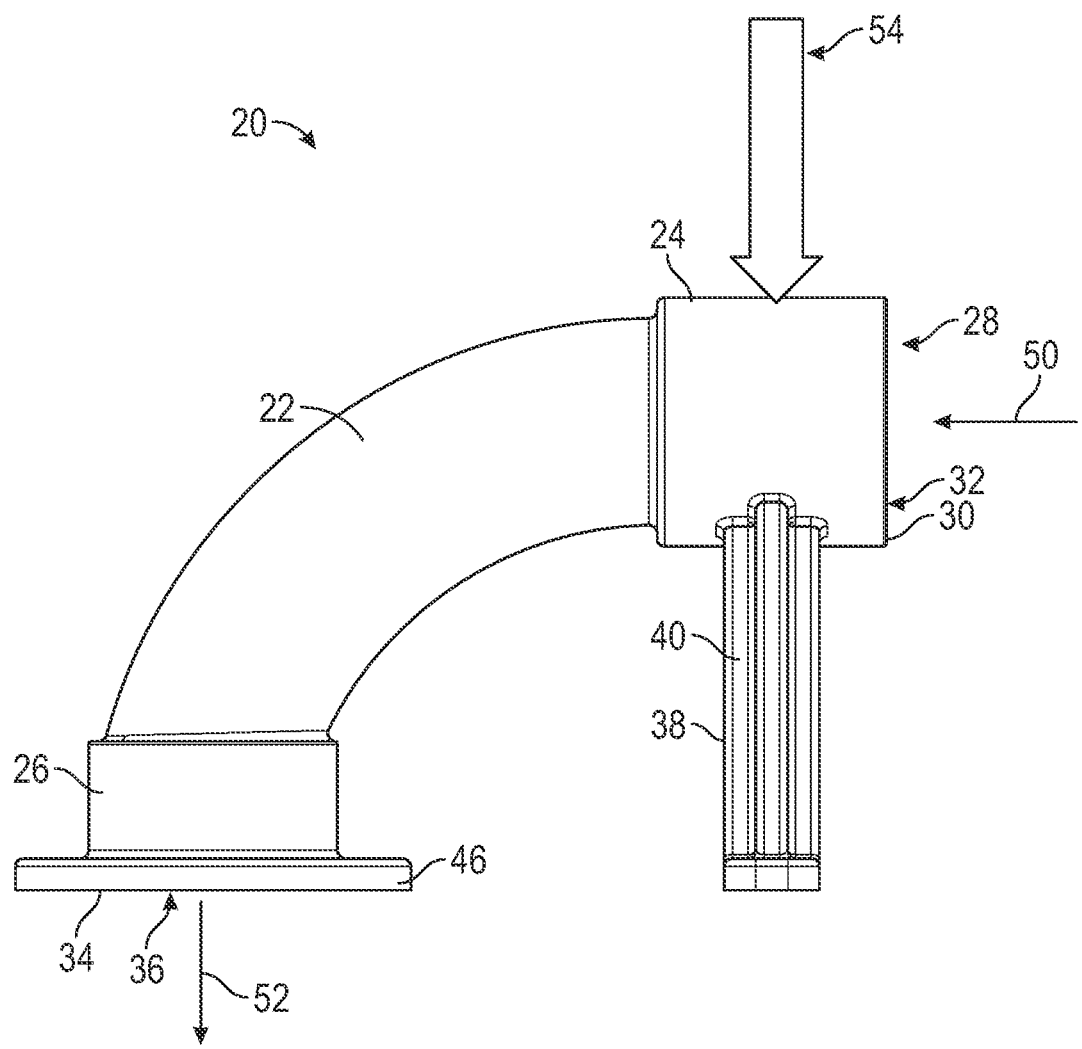
FIG. 2 is a side view of the curved conduit of FIG. 1.
Figure 3:
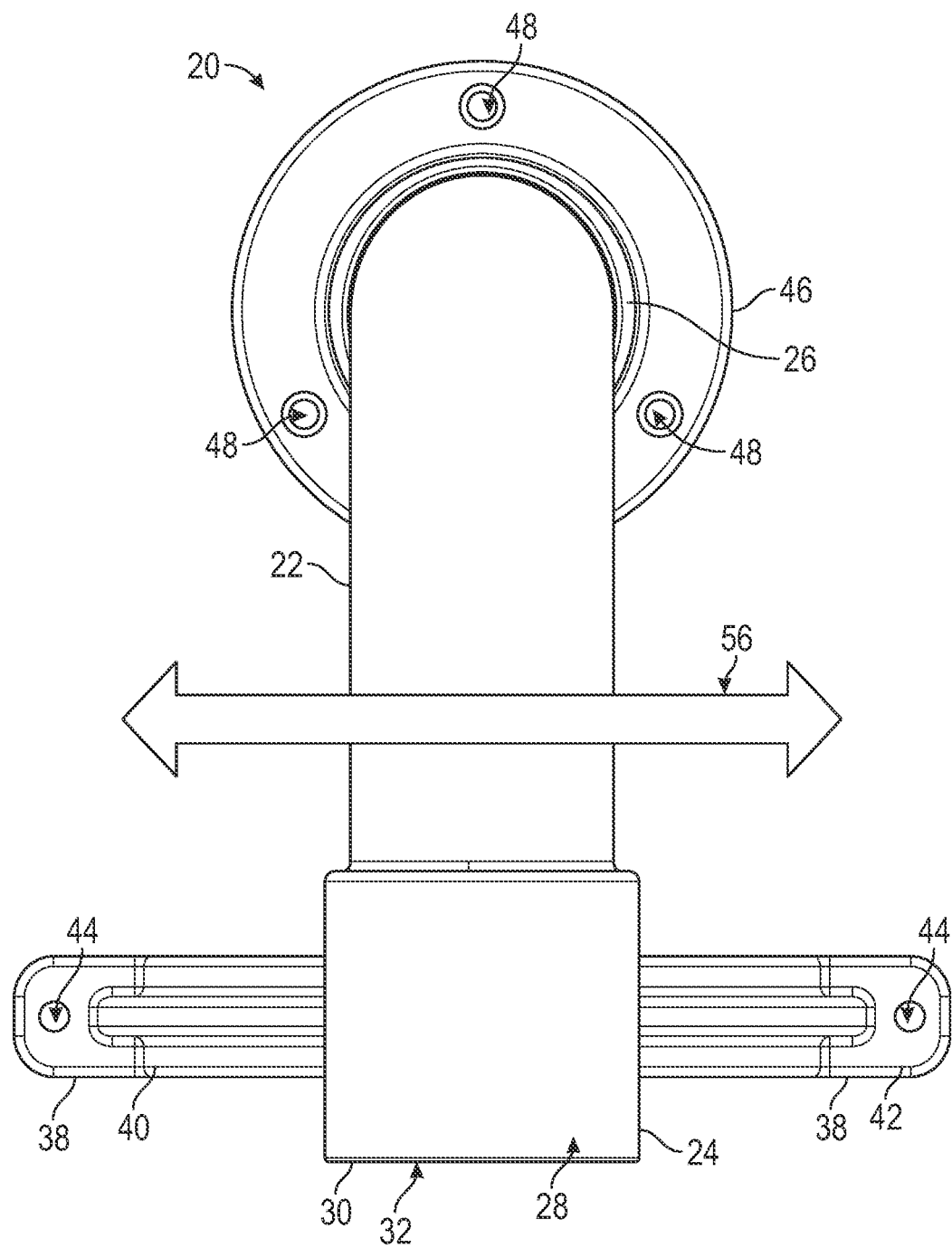
FIG. 3 is a top plan view of the curved conduit of FIG. 1.

FIGS. 1 through 3 illustrate a curved in-deck conduit 20 with a body 22 that is curved in shape, having a deck end 24 and a base end 26. An internal passage 28 within the body 22 begins at an entrance 30 located proximate the deck end 24 and defining an entrance direction 50 (see FIG. 2), and ends at an exit 34 located proximate the base end 26 and defining an exit direction 52 (see FIG. 2). The entrance direction 50 generally indicates a direction in which wiring can be guided into the body 22 of the curved conduit 20 and thereby through a poured concrete deck (not shown). Likewise, the exit direction 52 indicates how wiring can be guided out of the body 22 of the curved conduit 20 and thereby through a poured concrete deck (not shown). However, as used herein, "exit" and "entrance" are used for convenience of presentation and do not necessarily require that wiring or other components can only be threaded through a conduit in one direction—e.g., from entrance to exit. Generally, an "entrance direction" and an "exit direction" can be determined as a direction that is perpendicular to a plane defined by a cross-section of a passage at the relevant entrance or exit, respectively, or as a direction that is parallel to an axial direction of an entrance or exit region of an internal passage that is adjacent to or forms the relevant entrance or exit.

To provide improved stability and durability relative to conventional designs, some embodiments of the invention can include a least one support leg that extends from a body of a conduit to support the body at a location that is laterally spaced apart from the body (e.g., perpendicularly spaced apart from a path of an internal passage of the body as viewed from above). In this regard, for example, the conduit 20 of FIG. 1 includes two discrete support legs 38 that extend from the deck end 24 and project in the direction of the base end 26 and laterally from the exit 34. In at least one embodiment, the at least one support leg 38 includes a first (e.g., right) leg 40, and a second (e.g., left) leg 42. As shown in FIG. 3, the legs 40, 42 extend laterally to the outside of the deck end 24 to provide a wide base of support.

In different embodiments, various structures can be provided to secure a leg to a corresponding deck or other substrate. For example, each of the support legs 38 has a corresponding anchor point formed as a leg hole 44 that is sized to receive a fastener (not shown) to secure the in-deck curved conduit 20 to the form (e.g., a plywood form, not shown, on which the base end 26 and the legs 38 are seated). Similarly, although the ribbed cross-sectional profile of the legs 40, 42 can provide a particularly optimal balance between weight and stability, different cross-sectional profiles for one or more support legs are possible in some configurations.

The base end 26 includes a base flange 46, which is formed as an annular extension around a full circumference of the base end 26 but can otherwise extend laterally in other embodiments. Similarly to certain support legs (e.g., as discussed above), a base flange can generally include a variety of structures to secure the corresponding base to a form or other substrate. In at least one embodiment, the base flange 46 has multiple anchor points defined by flange holes 48 that are sized to receive a fastener (not shown) to secure the in-deck curved conduit 20 to the form (not shown). Thus, the base flange 46 at the base end 26 of the body 22 may be used to selectively secure the body 22 to a desired base location on a form for a concrete deck (not shown).

In different embodiments, an internal passage defined by an in-deck conduit can provide a curved or otherwise bent path for wiring or other devices. For example, as shown in FIG. 1, the deck end 24 extends horizontally. Similarly, the base end 26 extends vertically, with the entrance direction 50 being thereby substantially perpendicular. Accordingly, with the deck end 24 is spaced from the base end 26, the conduit 20 can generally provide a ninety-degree change in direction for wiring received therethrough. In particular, the conduit 20 is shown with a smoothly curved profile for the internal passage 28 (e.g., with a radius of curvature of at least about 4 or about 5 inches), although other configurations are possible.

Generally, in-deck conduits can be configured to be secured to sheets of plywood used as forms for decking, as can provide a generally planar mounting surface. Correspondingly, for example, distal ends of the support legs 38 are co-planar with the base flange 46. Similarly, fastener axes extending through the leg holes 44 are generally parallel to the exit direction 52 (see FIG. 2), as are the one or more fastener axes through the at least one flange hole 48 are parallel to the exit 34. As also discussed above, in some embodiments, the entrance direction 50 can be perpendicular to the exit direction 52.

Referring to FIG. 3 in particular, the leg holes 44 are laterally spaced from the entrance 30 relative to a reference direction that extends between the entrance 30 and the exit 34 (e.g., as viewed from above). Thus, when the conduit 20 is secured to a deck via the leg holes 44, the support legs 38 can provide relatively rigid support to the deck end 24, including when the deck end 24 is subjected to a downward force 54 at the deck end 24 (see FIG. 2) or is subjected to a lateral force 56 at or near the deck end 24 (see FIG. 3).

Although the conduit 20 is shown with the legs 40, 42 formed as distinct (albeit integral) extensions from the body 22, other configurations are possible. For example, laterally extending support legs can be formed as part of a single extension from a body of an in-deck conduit. Further, one or more legs may sometimes extend at least partly along a direction of a passage through an in-deck conduit (e.g., as viewed from above) in addition to extending perpendicularly from a relevant body. However, arrangements in which support legs are aligned to be laterally spaced from, and vertically below, an entrance of an in-deck conduit (e.g., as shown in FIGS. 1-3) may provide a particularly stable arrangement in some cases. Further, in some cases support legs similar to those shown for the in-deck conduit 20 can be used with other conduits, including conduits that may not exhibit a continuously curved profile like the conduit 20, that may not exhibit perpendicular entrance and exit directions, or that may otherwise vary from the conduit 20 as shown.

Figure 4:
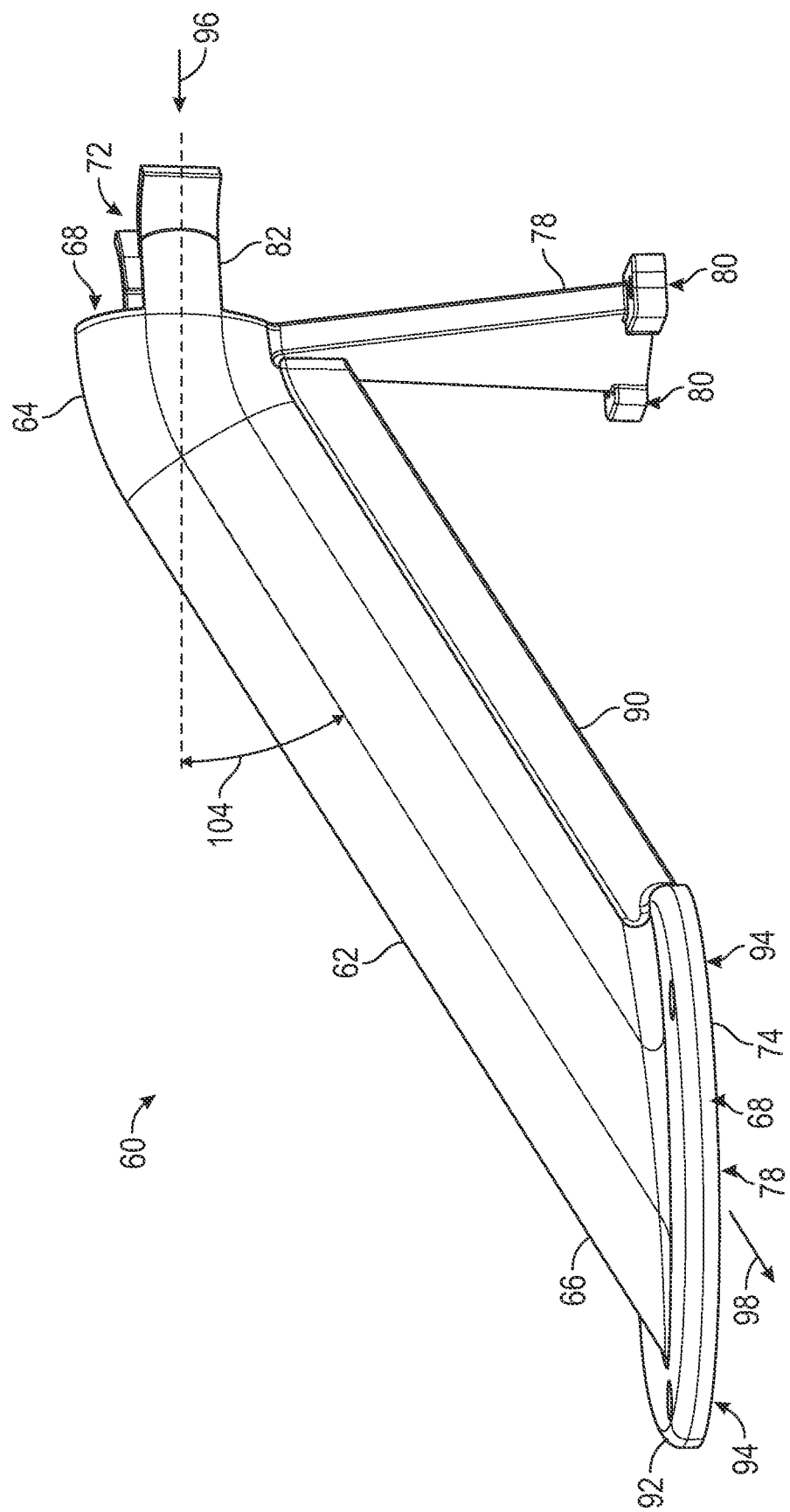
FIG. 4 is an isometric view of an angled in-deck conduit according to an example of the disclosed technology.

FIG. 4 illustrates an angled conduit 60 with a body 62 that exhibits an internal angle rather than a continuous internal curve between a deck end 64 and a base end 66. An internal passage 68 within the body 62 begins at an entrance 70 having an entrance direction 96 located proximate the deck end 64, and ends at an exit 74 having an exit direction 98 located proximate the base end 66. The direction of the internal passage 68 changes from the entrance 70 to the body 62, although in the illustrated example, the transition from the entrance direction 96 to the exit direction 98 is less than 90 degrees. Further, in the illustrated embodiments, the direction of the internal passage 68 changes only at the deck end 64, so that the internal passage 68 is substantially straight over a majority of the body 62. In some cases, for example, this may allow for easier routing of wiring or other components through the conduit 60 from the entrance 70 to the exit 74 (or vice versa).

The conduit 60 further includes a unified support leg structure 78 that extends from the deck end 64 downward toward the associated form (not shown) and in opposing lateral directions relative to the deck end 64 and the passage 68 and the body 62 generally. As also noted above, in different embodiments support legs can exhibit a variety of structures to allow the support legs to be readily secured to a plywood deck or other substrate. In the illustrated example, the support leg 78 has two leg holes 80 at opposing lateral ends of the support leg 78 opposite the body 62, so that the leg holes 80 are aligned to secure the conduit 60 to a plywood deck at locations that are spaced laterally apart from the body 62. In particular, the leg holes 80 are sized to receive a fastener (not shown) to secure the in-deck curved conduit 60 to the form (not shown), although other configurations are possible (e.g., with integrally formed spikes or other integral fasteners).

Figure 6:
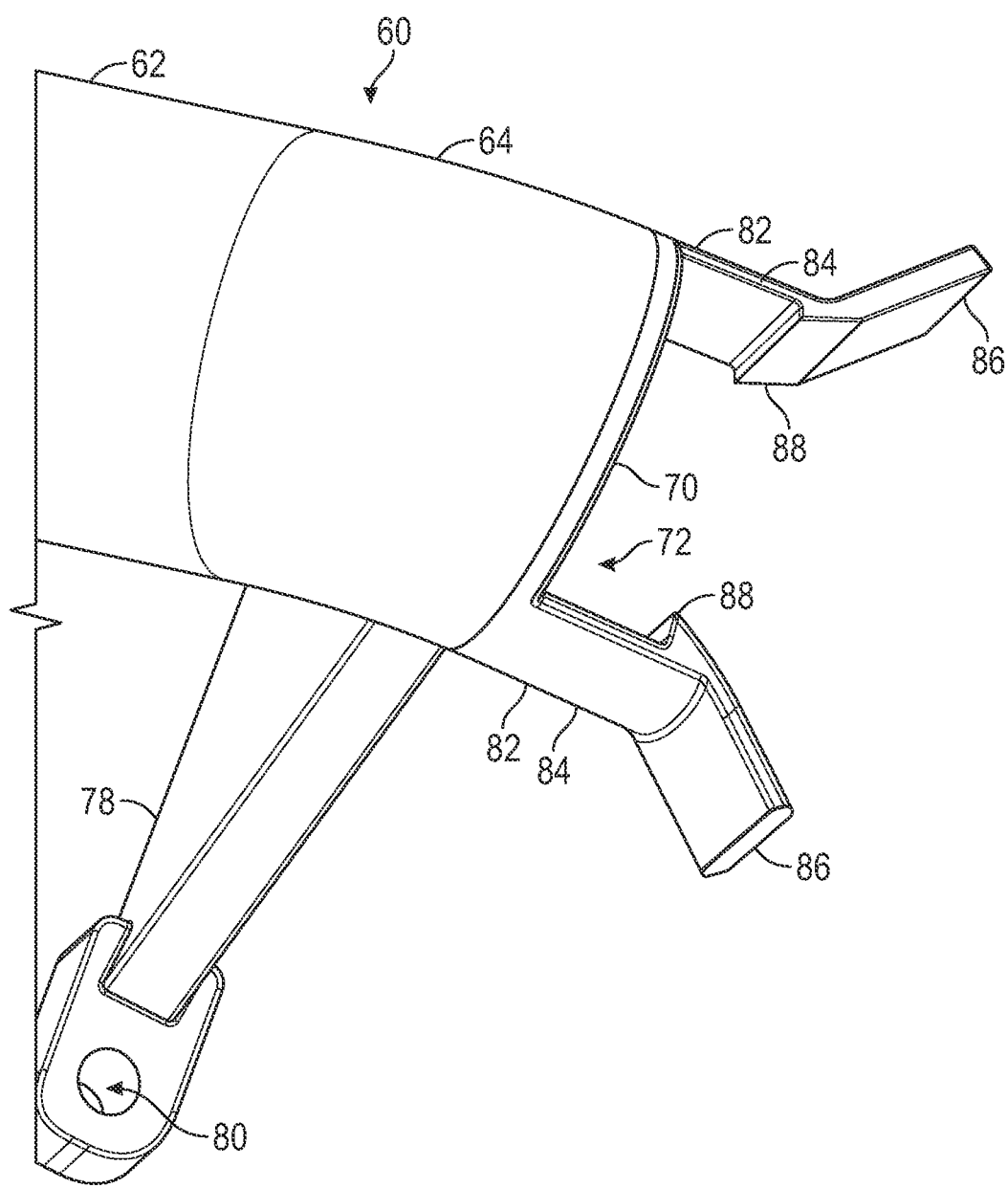
FIG. 6 is an isometric view of a deck end of the angled conduit of FIG. 4.

In some embodiments, an in-deck conduit can include arms (e.g., external arms) that are configured to resiliently engage and secure tubing or other objects relative to the conduit. For example, the conduit 60 includes a plurality of locking arms 82 connected to and extending outward from the deck end 64. As shown in FIG. 6 in particular, each of the arms 82 includes an extension portion 84 that projects from the deck end 64 and extend substantially parallel to the entrance direction 96 (see FIG. 4).

In some cases, arms for an in-deck conduit can include formations to resiliently engage corrugated tubing or other similar structures to retain the tubing or other structures relative to the conduit. In this regard, for example, distal ends of the extension portions 84 have, respectively, both a tab 86 and a catch 88 (see FIG. 6) that extend in opposing directions from the relevant extension portion 84. The tabs 86 project laterally outwardly relative to the entrance direction 96 and the catches 88 project laterally inward relative to the entrance direction, with the catches 88 in the illustrated embodiment also extending toward each other from opposing sides of the entrance 70. Further, the tabs 86 and the catches 88 are obliquely angled relative to the entrance direction 96, with the tabs 86 extending away from the deck end 64, and the catches 88 extending toward the deck end 64. In some embodiments, however, one or more catches or tabs may not necessarily extend obliquely relative to the entrance direction 96. Similarly, although planar catches 88 and tabs 86 are shown in FIG. 6, curved or otherwise non-planar catches and tabs are possible in other examples.

Generally, the angled configuration of the tabs 86 and the catches 88, as well as the extended configuration of the extension portions 84 (and the arms 82 generally) can allow for a user to engage the catches 88 of the arms 82 to retain a corrugated tube simply by pushing the tube into (or into alignment with) the entrance 70 of the passage 68. Similarly, a user can manually (e.g., without tools) release such a tube simply by manually moving the tabs 86 laterally outward.

Figure 5:
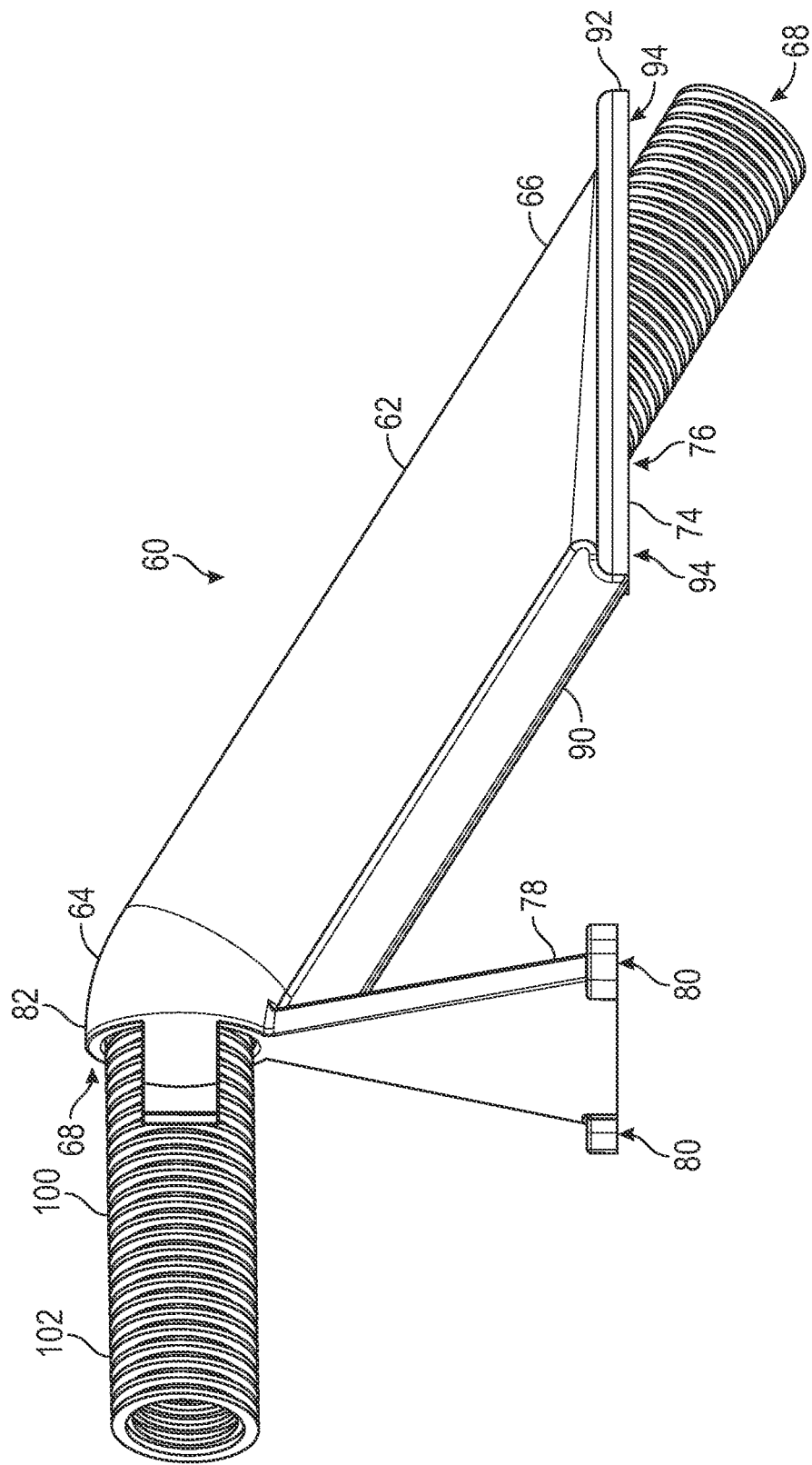
FIG. 5 is an isometric view of the angled conduit of FIG. 4 with a corrugated tube inserted therein.
Figure 7:
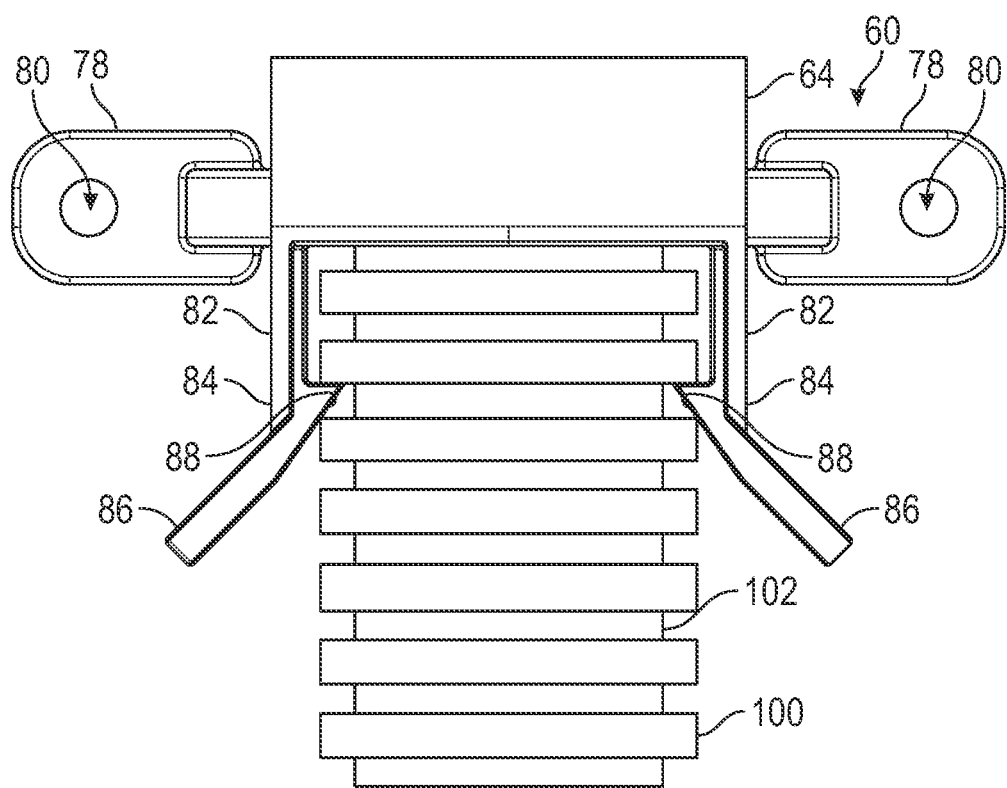
FIG. 7 is a top plan view of the deck end of the angled conduit of FIG. 4 with a corrugated tube inserted therein.

Referring to FIGS. 5-7, for example, the angled conduit 60 is configured to receive and retain a corrugated tube 100, an outer diameter of which includes corrugated recessed portions 102, including so that the configured corrugated tube 100 extends beyond the entrance 70 and the exit 74 (cee FIG. 5). As can be seen best in FIG. 7, the catch 88 can resiliently retain the corrugated tube 100 by lodging in one of the corrugated recessed portions 102 of the corrugated tube 100. Thus, as also noted above, the tab 86 can manipulated by an operator (not shown) to selectively release the corrugated tube 100 from the catch 88 as desired. Further, due to the angled configuration of the catches 88, as also generally noted above, a user may be able to easily insert the tube 100 fully through the passage 68, from the entrance 70 to the exit 74, with the arms 82 automatically ratcheting to permit insertion of the tube 100 in one direction and prevent withdrawal of the tube 100 in the opposite direction.

In some embodiments, one or more reinforcing structures can be provided. As shown in FIG. 5, for example, the body 62 has a gusset formed as a support rib 90 that provides additional rigidity to the body 62 along the length of the body 62. In other embodiments, other structures are possible. Further, although the integral construction of the in-deck conduit 60 can be notably beneficial in some regards, other manufacturing approaches are also possible.

Referring again to FIG. 4 in particular, the base end 66 includes a base flange 92 that extends radially outward at the base end 66. Generally, a variety of structures can be provided to secure the base flange 92 to a form. For example, in the illustrated example, the base flange 92 has multiple flange holes 94 that are sized to receive a fastener (not shown) to secure the in-deck curved conduit 60 to the form (not shown).

In some embodiments, the deck end 64 extends horizontally, as indicated by the entrance direction 96. In some embodiments, the entrance direction 96 indicates how wiring can be guided into the body 62 of the angled conduit 60 and thereby through a poured concrete deck (not shown). In some embodiments, the exit direction 98 indicates how wiring can be guided out of the body 62 of the angled conduit 60 and thereby through a poured concrete deck (not shown).

In some embodiments, as also generally noted above, an internal profile of a passage of an in-deck conduit can be contoured so as to improve the ability of users to feed tube or other objects through the passage. In this regard, for example, the entrance direction 96 of the conduit 60 is substantially horizontal and the exit direction 98 departs from the entrance direction 96 by an angle 104 of less than 90 degrees (see FIG. 4). In some embodiments, an exit direction (e.g., the exit direction 98) can depart from an entrance direction (e.g., the entrance direction 96) at an angle of less than 40 degrees, or between 20 degrees and 40 degrees. Thus, for example, wiring, tubing, or other devices to be fed through the passage 68 may not need to be guided around sharp bends and may be less likely to become caught on internal geometry of the passage 68. Further, as illustrated in FIG. 5 in particular, the illustrated configuration can beneficially allow the tube 100 to exit a concrete deck (not shown) more closely aligned to parallel relative to the concrete deck.

Continuing, in some cases, a passage of an in-deck conduit can be designed to minimize internal bending and thereby help to minimize the chance of wiring, tubing, etc. catching within the passage during installation. In this regard, for example, as shown in FIGS. 4 and 5 in particular, the passage 68 extends substantially parallel to the exit direction 98 for a majority (e.g., 80% or more, as shown) of a total length of the passage 68. Particularly as combined with the single, relatively shallow bend as indicated by the angle 104, this configuration can substantially improve the ability of users to install wiring, tubes, etc. to extend fully through the passage 68.

Figure 8:
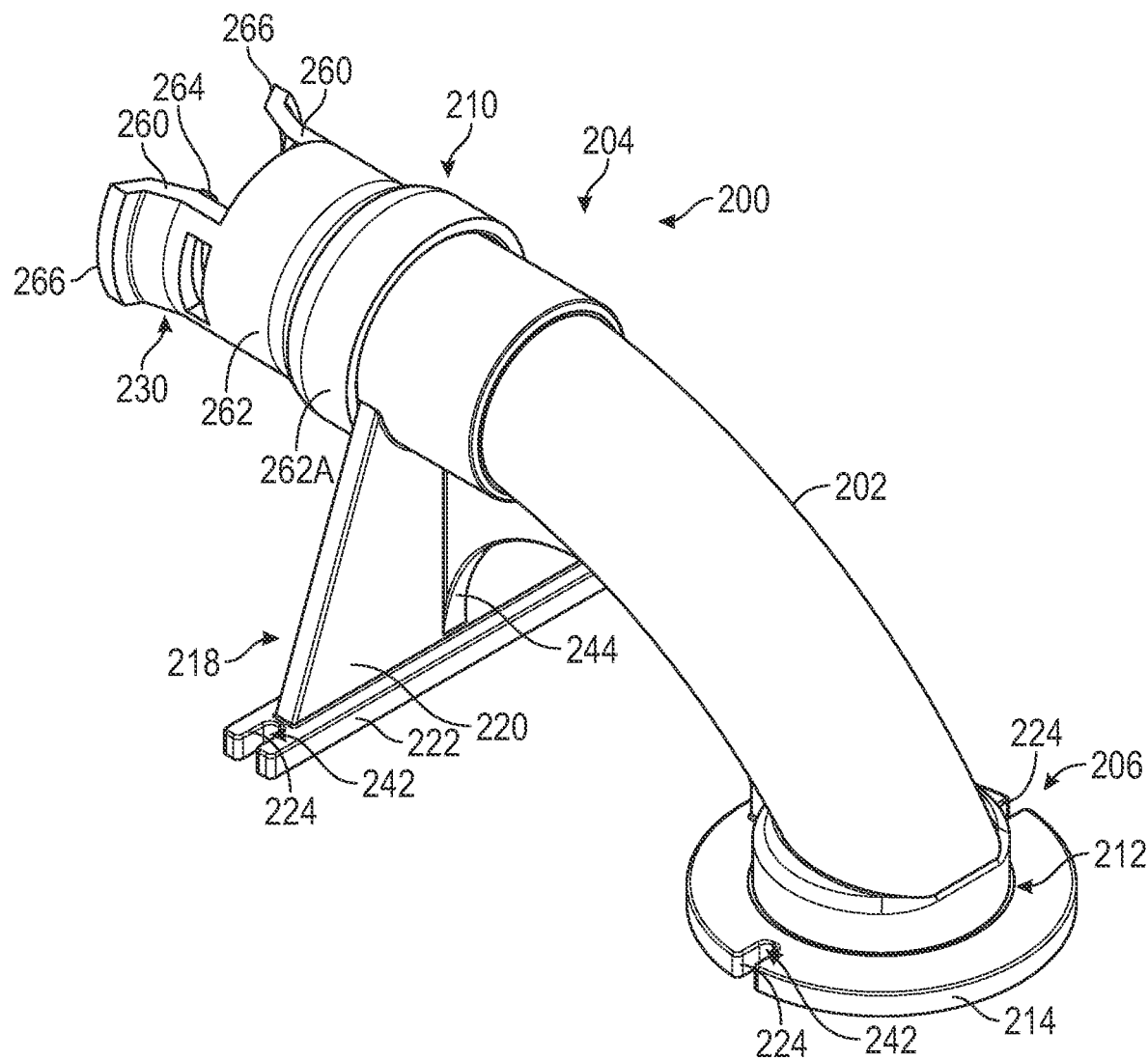
FIG. 8 is an isometric view of another in-deck conduit according to an example of the disclosed technology.
Figure 9:
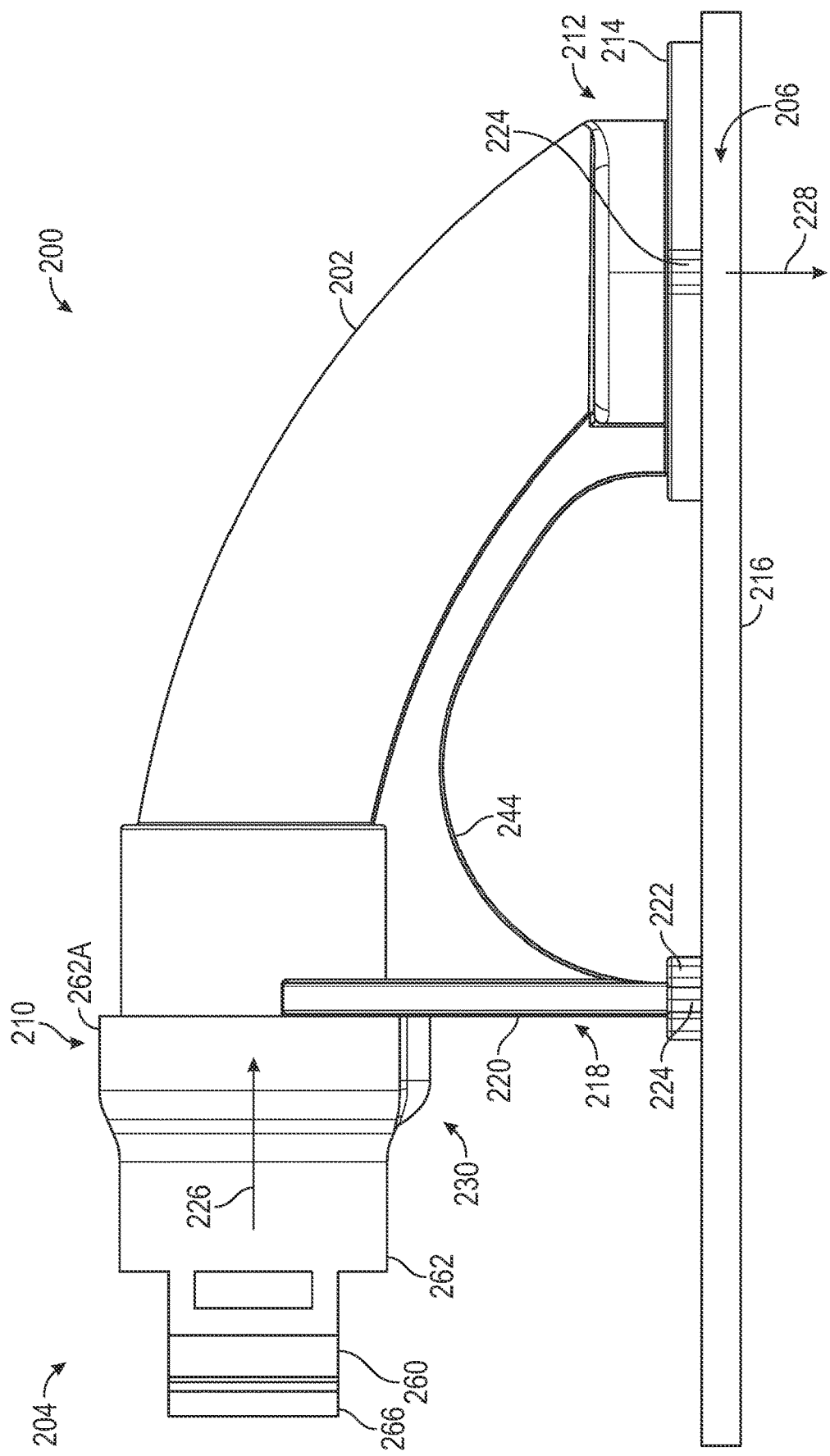

Another example in-deck conduit 200 is shown in FIGS. 8 through 10. The conduit 200 is generally similar to the conduits 20, 60 discussed above and thus discussion presented above relative to the conduits 20, 60 also generally applies to similarly named or structured components of the conduit 200. In particular, similar to the conduit 20, the conduit 200 includes a body 202, a deck end 204, a base end 206, and an internal passage 208 that extends between an entrance 210 to the body 202 at the deck end 204 and an exit 212 from the body 202 at the deck end 204. In the illustrated example, the entrance 210 includes circular apertures 210A, 210B (see FIG. 11A) at the deck end, as defined by an end adapter 230 (as further discussed below) and a first end of a curved portion of the internal passage 208. Similarly, the exit 212 at the base end 206 includes circular apertures 212A, 212B (see FIG. 11A) at the base flange 214 and at a second end of the curved portion of the internal passage 208. In other examples, non-circular apertures at entrances or exits of a conduit are also possible.

The conduit 200, like the conduits 20, 60 is configured to be seated on a form for a concrete deck, so as to provide a passage within the concrete deck (once poured) for electrical wires or other objects. In this regard, for example, a base flange 214 is integrally formed at the base end 206 of the body 202 to support the body 202 relative to a form 216 for a concrete deck (see FIG. 9). Additionally, a leg structure 218 is integrally formed at the deck end 204 of the body 202 to support the body 202 relative to the form 216.

Figure 11A:
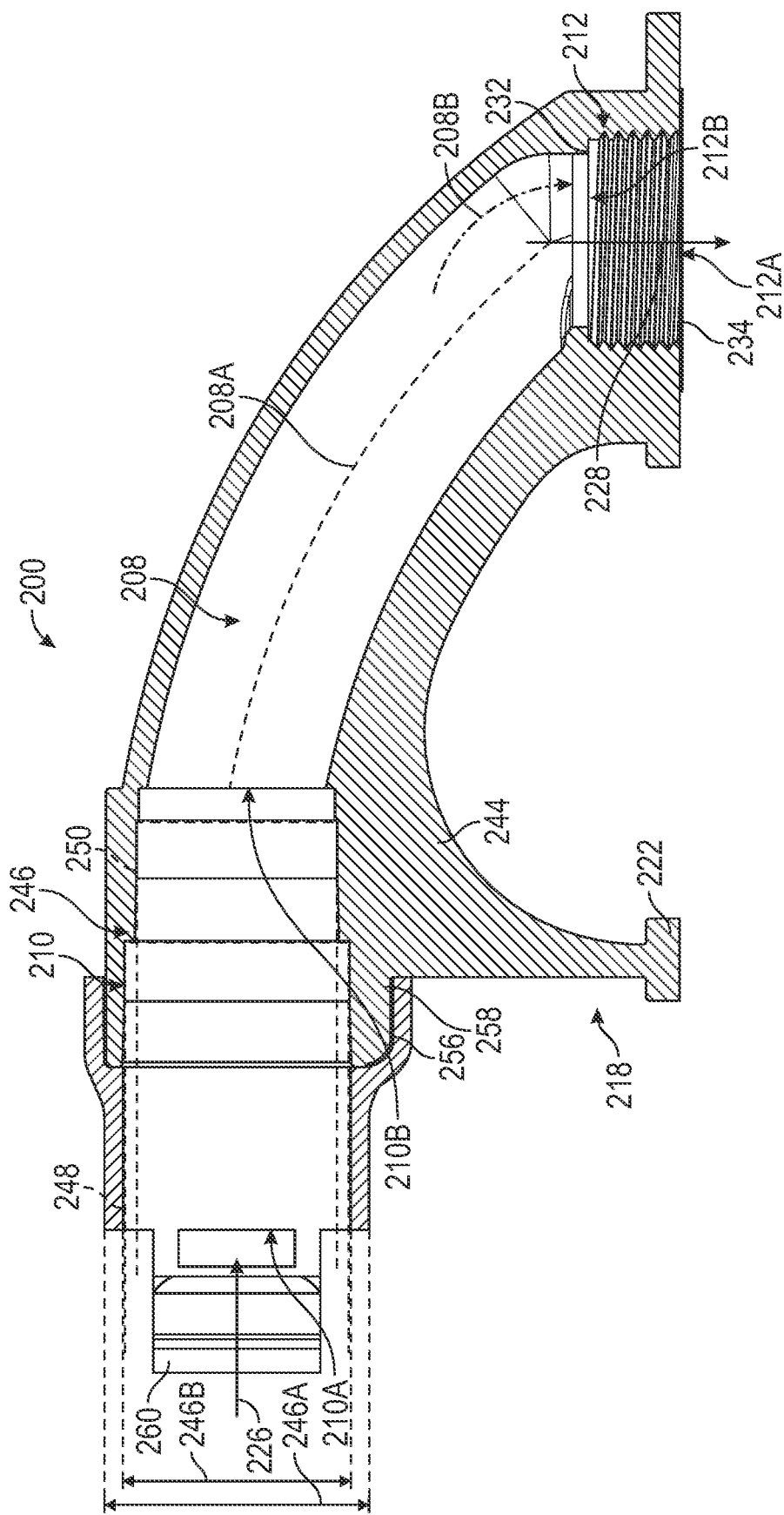
FIG. 11A-11C are a cross-sectional side elevation and detail views of the in-deck conduit of FIG. 8.

Generally, openings (e.g., entrances and exits) of a conduit can define directions for feeding wire through an internal passage (e.g., entrance and exit directions, respectively, for feeding wire into and out of the passage). In the illustrated example, the sets of apertures 210A, 210B and 212A, 212B define substantially perpendicular entrance and exit directions. In particular, with the conduit 200 seated on a horizontal form, the apertures 210A, 210B individually and collectively define a substantially horizontal entrance direction 226 (e.g., as measured perpendicular to a center/centroid point of the relevant aperture(s) 210A, 210B). Likewise, the apertures 212A, 212B individually and collectively define a substantially vertical exit direction (e.g., as measured perpendicular to a center/centroid point of the relevant aperture(s) 212A, 212B). In other embodiments, other configurations are possible, including configurations with entrance In some examples, other body structures of a conduit can individually (or collectively) also improve the case with which operators can feed wires through a relevant internal passage. For example, some conduit bodies can define exits with expanded lateral dimensions (e.g., expanded internal diameters), as compared to an adjacent end of a relevant internal passage. In some cases, such an expansion of effective diameter can help to prevent wire or fish tail devices (etc.) from catching on a far wall of the internal passage during installations. For example, as shown in FIG. 11A, an expanded diameter from an internal shoulder 232 at an exit end of the internal passage 208 can allow wires to be moved along a curved path 208B at a far side wall of the passage 208. In particular, the curved path 208B thus does not include protruding catches or other obstructions as may impeded progress of wires in conventional designs. In other words, because the exit 212 is formed to be wider than the end of the curved portion of the internal passage 208 (e.g., at the shoulder 232 as shown), wires can be more easily passed through the conduit 200 than through conventional conduits.

Figure 11B:
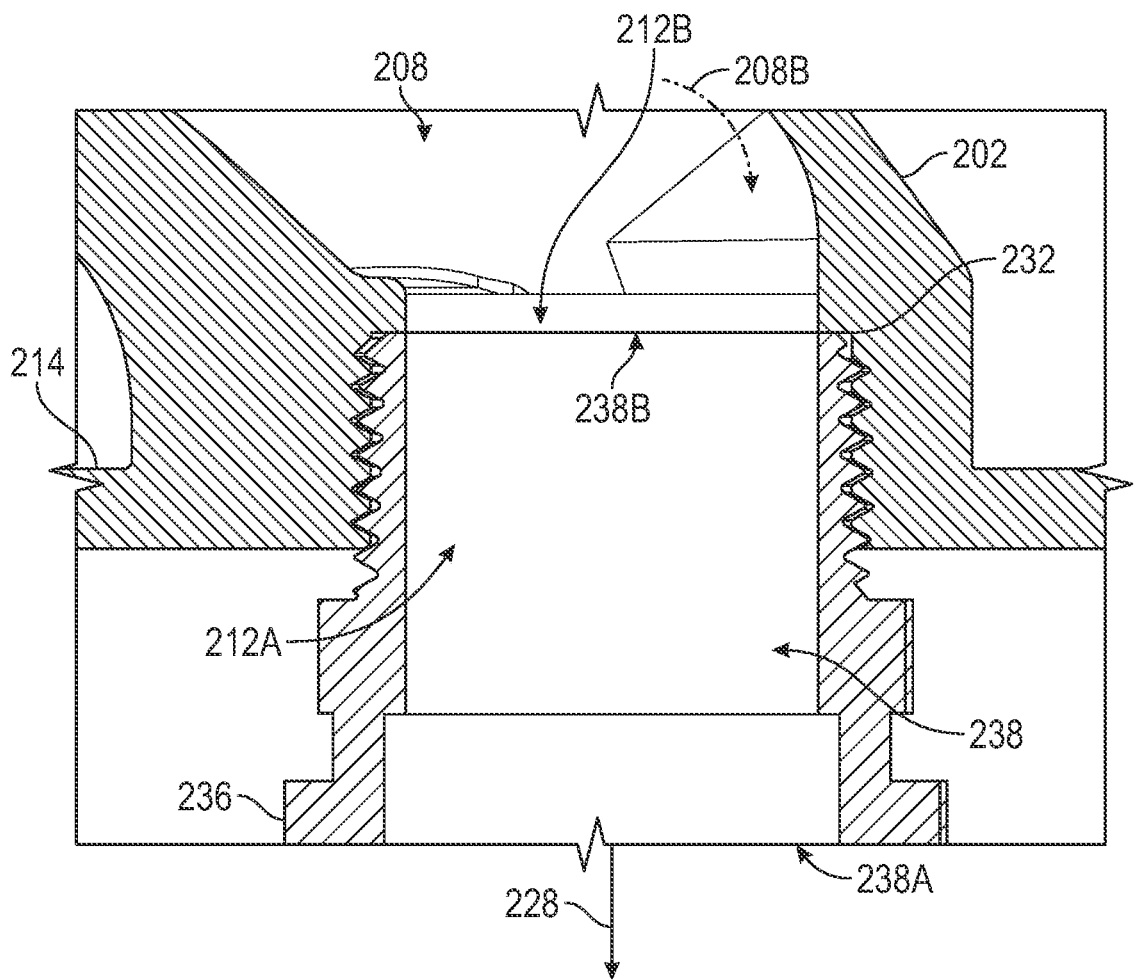

In some cases, such an expansion of internal dimension can also provide for improved exit profiles when used with other exit structures, including when apertures for the exit 212 are further defined by separate, selectively attachable components. As shown in FIGS. 11A and 11B for example, in some installations, a cover 234 can be used to close the base end 206 against concrete (see FIG. 11A), then replaced with a threaded coupler 236 for service (see FIG. 11B). Although the coupler 236 is shown with a particular profile and size, those of skill in the art will recognize that other couplers for in-deck conduits may exhibit other configurations.

In particular, as shown in FIG. 11B, the coupler 236 includes a coupler passage 238 (for wire, etc.) with circular apertures 238A, 238B that individually and collectively further define the profile of the exit 212 in the illustrated configuration. Similarly to the apertures 212A, 212B the apertures 238A, 238B also define a substantially vertical exit direction (e.g., as measured perpendicular to a center/centroid point of the relevant aperture(s) 238A, 238B). Further, due to the larger diameter location of the threads on the body 202, as provided by the expanded diameter at the shoulder 232, the coupler 236 can be threadedly engaged with the body 202 to provide a continuous internal conduit for wires. In particular, as shown in FIG. 11B, a tangent-surface transition can be provided from the exit end of the internal passage 208 to an entrance end of the coupler passage 238, at the interface between the separate components (i.e., an internal diameter may be substantially (or more) equal for each of the passages 208, 238 at the interface therebetween). Thus, the coupler 236 can be seated on or otherwise aligned axially with the shoulder 232 to appropriately align the internal passage 208 (including the curved path 208B) to ensure smooth passage of wires or other objects.

In some cases, the curved portion of the internal passage 208 can extend over a majority of the length of the conduit 200 (e.g., in an elongate direction thereof, as shown left-to-right in FIG. 11A). This configuration can generally provide for smoother feeding of wires through the conduit 200, including for loose wires and for operators using fish tape (or similar) devices as known in the art. In the illustrated example, the particular structural configuration of the conduit 200 can usefully support the curved portion of the passage 208 over an extended length and with a relatively large radius of curvature. In some cases, a radius of curvature 208A of at least 4.5 inches can be beneficial, as measured along a centerline of the curved portion of the passage 208 (e.g., in particular, a radius of 5 inches, or a radius of 5.5 inches, as shown, or more).

Some conduits, including in particular those with a larger radius of curvature as discussed above, can use similar smaller-angle transitions into or within internal passages as are discussed relative to FIG. 4 above. For example, as shown in FIG. 11A, the curvature of the internal passage 208 ensures that all lines within the internal passage that meet the aperture 210B and are tangent to the path of the centerline of the passage 208 (as shown at radius of curvature 208A) also define departure angles from the entrance direction 226 of less than 40 degrees.

As also discussed above, a relatively wide leg structure can generally provide various benefits for in-deck conduits, including with respect to stability and durability for an elongate internal passage with a relatively large radius of curvature (e.g., the passage 208). In this regard, as shown in FIG. 10 in particular, the body 202 exhibits a body width 202A as measured at the deck end 204 in a lateral direction 240 (e.g., perpendicular to the entrance direction 226, as shown). The width 202A may be relatively small to reduce material use and overall footprint, while still accommodating the internal diameter of the internal passage, and appropriate material thickness to ensure structural soundness of the body 202 as a whole (e.g., various internal features at the entrance 210 and the exit 212, as further discussed herein relative to FIGS. 11A-C).

In contrast to the body 202, the base flange 214 exhibits a relatively large lateral width 214A, and the leg structure 218 exhibits an even larger lateral width 218A. For example, the width 218A of the leg structure 218 can be greater than or equal to about 170% of the width 202A of the body 202 at the entrance 210. Further, in some cases, this width criterion can be met whether measured at a maximum at the lateral-most contact points with the form 216, as indicated at width 218A, or at an anchor point for fastening the leg structure 218, as indicated at width 218B.

To provide improved structural strength and reduce mold complexity, for example, some leg structures can be formed as unitary structures extending continuously between opposing support points (e.g., anchor points for fasteners, or widest contact points with a form). As shown in FIG. 8 in particular, the example leg structure 218 of conduit 200 forms a triangular support structure that extends continuously across the lateral widths 218A, 218B (see also FIG. 10). A planar triangular leg structure, as shown for an upper gusset 220 of the leg structure 218, can provide good overall strength as well as an anchor for other support structures (e.g., other gussets, as further discussed below). However, other configurations are possible. In some cases, a planar triangular (or other) leg structure can be further supported by a widened base, including a widened rectangular support flange 222 as shown for the conduit 200. In some examples, cut-outs or other non-continuous or non-planar structures can be provided in otherwise similarly triangular (or other) leg structures, as desired.

In some examples, a leg structure can help to support other strengthening features for an in-deck conduit. For example, as briefly noted above, the triangular leg structure 218 can provide a robust central support for a rib or other gusset structure to support the body 202 and the internal passage 208 therein. As shown in FIG. 9 in particular, the illustrated example of the conduit 200 includes an arched gusset 244 that extends continuously from the leg structure 218, along the body 202, to the base flange 214. The arched profile of the gusset 244 can thus provide substantial reinforcement to the body 202 along the entire length of the internal passage between the leg structure 218 and the base flange 214. As a result, the conduit 200 can provide notably improved protection of the internal passage 208 against external loads, as well as improved distribution of vertical loading in general to the widened base flange 214 and leg structure 218.

In some cases, particular arrangement of anchor points and other support features (e.g., leg structures and base flanges) can allow for easier and more reliable installation. For example, as shown in FIG. 10, slots 224 that are open-ended in the lateral direction 240 can provide anchor points 242 on the leg structure 218 for fasteners (e.g., nails, not shown) to secure the conduit 200 to a form. Similar slots 224 can also provide similar anchor points 242 on the base flange 214. Particularly with the tapered (triangular) profile provided by the upper gusset 220 of the leg structure 218, the illustrated slot arrangement may allow users to easily operate hand tools around the body 202 and other structures to securely and reliably install the conduit 200 on a form at a desired location.

To further improve versatility of use, the conduit 200 can also exhibit improved internal structures at the entrance 210. For example, as shown in FIG. 11A in particular, the entrance 210 includes an internal stepped profile 246 with a first internal diameter 246A sized to secure a first electrical conduit 248 having a first external diameter, and a second internal diameter 246B sized to secure a second electrical conduit 250 having a second external diameter that is smaller than the first external diameter. (Conduit 248, 250 are rendered schematically and transparently for clarity of presentation.) Thus, for example, the stepped profile 246 can allow the conduit 200 to easily receive different sizes of PVC, EMT, or other conduit fully into the entrance 210. Although the illustrated arrangement may be particularly useful for commonly used tube sizes, other embodiments can include differently proportioned or numbered steps at relevant entrances or exits.

Figure 11C:
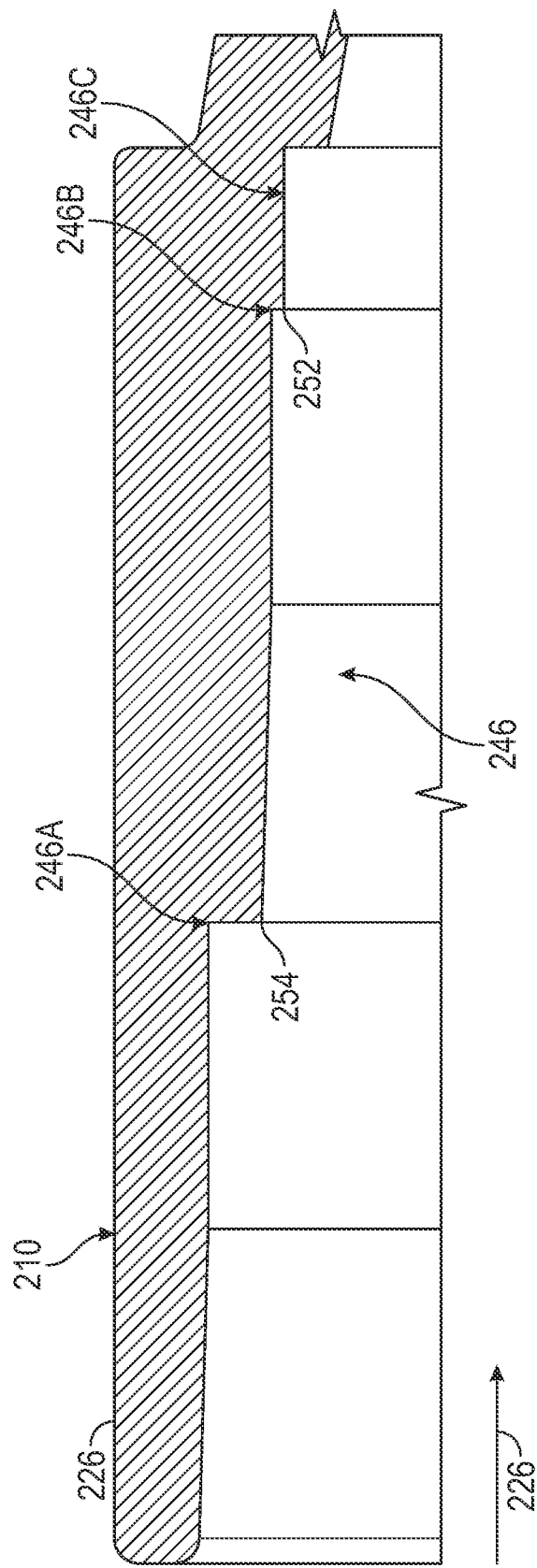

In some cases, one or more regions of a stepped (or other) entrance profile can exhibit a tapering profile, to help align and secure tubes received therein. For example, as shown in FIG. 11C, the internal diameters 246A, 246B are preceded by an inward taper, relative to the entrance direction 226. Accordingly, operators are presented with a somewhat wider opening to initially receive an inserted conduit (e.g., PVC tube), and can thereafter firmly secure the inserted conduit in part using the progressive narrowing of the internal diameter at the entrance 210 (as well as adhesive or other attachment devices, in some cases). As also shown in FIG. 11C, a third (smallest) internal diameter 246C can provide a shoulder 252 and the taper to the diameter 246B can provide a shoulder 254 within the entrance 210. Accordingly, the shoulder 252 can provide a stop corresponding to the diameter 246B and the shoulder 254 can provide a stop corresponding to the diameter 246A, to ensure and tactilely confirm full-depth insertion of corresponding conduit. Other structures can also be provided, including another section of widened diameter, relative to the curved portion of the internal passage 208, as shown. Such structures, for example, can help to accommodate removal of a mold core or other operations during manufacture As also noted above, a locking mechanism can be provided at an entrance (or other) end of an in-deck conduit in some cases, to help secure corrugated or other tubing. In some examples, such a locking mechanism can be integrally formed with a body of the in-deck conduit. In some examples, a locking mechanism can be provided one (or as) an adapter that can be selectively secured to a separately formed body.

Figure 12:
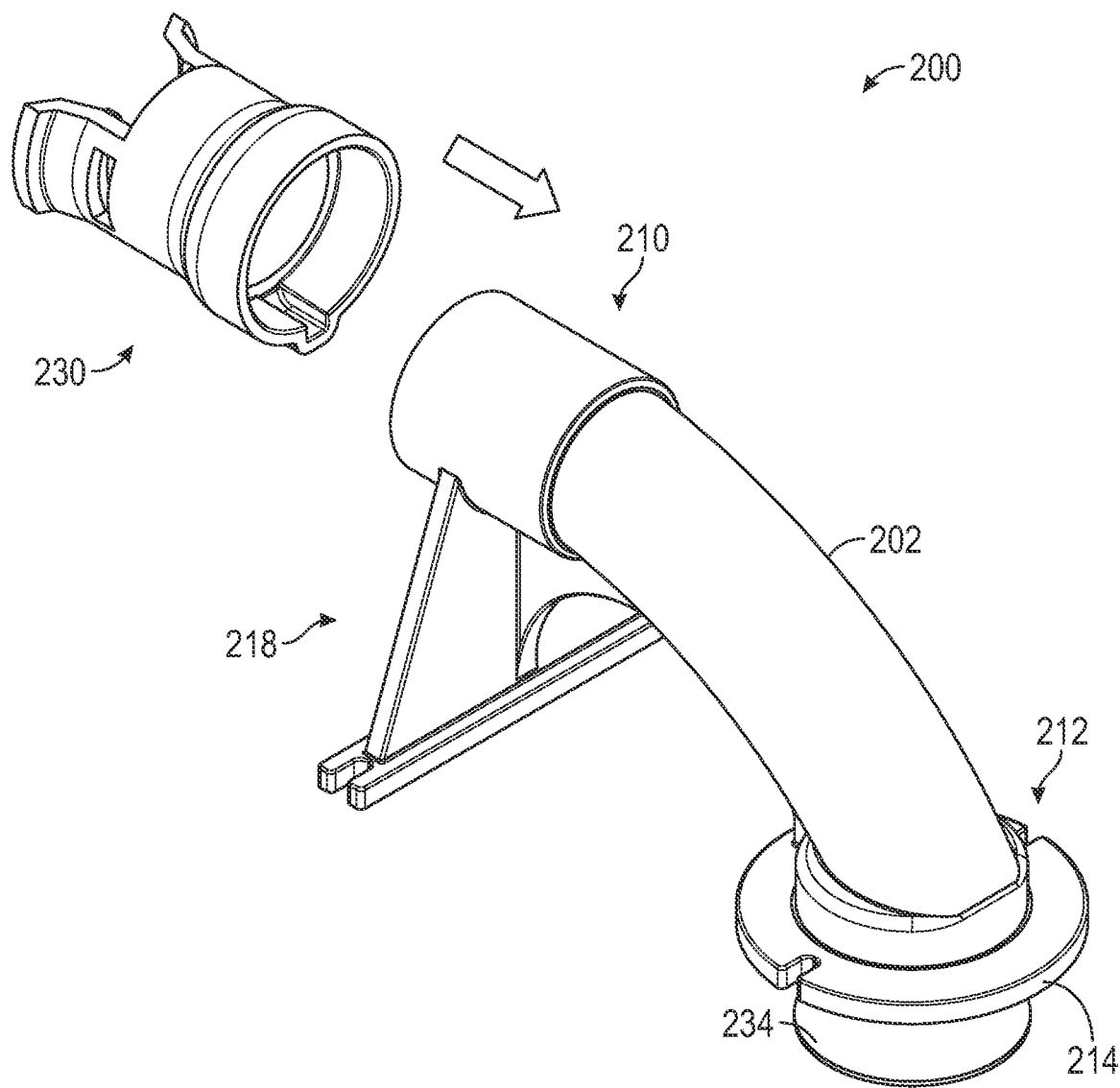
FIG. 12 is an exploded isometric view of the in-deck conduit of FIG. 8.

As also noted above, in the illustrated configuration, the conduit 200 can selectively include the end adapter 230, which is configured in particular to secure corrugated tubing relative to the internal passage 208. As illustrated in FIG. 12 in particular (see also FIG. 11A), the adapter 230 can be integrally formed separately from the body 202, then secured to the body 202 using various types of adhesive or mechanical arrangements (e.g., fasteners, snap- or press-fit engagement, etc.). In other examples, however, similar structures as are shown for the adapter 230 can be integrally formed with the body 202 or other bodies. Generally, an adapter can be sized to also provide a tangent-surface transition between the adapter and a corresponding body (e.g., as shown for the adapter 230 and the body 202 in FIG. 11A).

In particular, some examples can include alignment features to assist in assembly of an end adapter and body. For example, the adapter 230 can be secured to the body 202 using a tongue and groove attachment structure, such as with a groove 256 formed on the adapter 230 and a tongue 258 formed on the body in the illustrated example (or vice versa, in other examples). Alignment of the tongue 258 (and of the structure that defines the groove 256) along an underside of the entrance 210, as shown, can also effectively extend the benefits of the arched gusset 244 to an opposite side of the leg structure 218 from the gusset 244. In other examples, however, other alignments of tongue and groove or other attachment structures are possible.

Figure 13A:
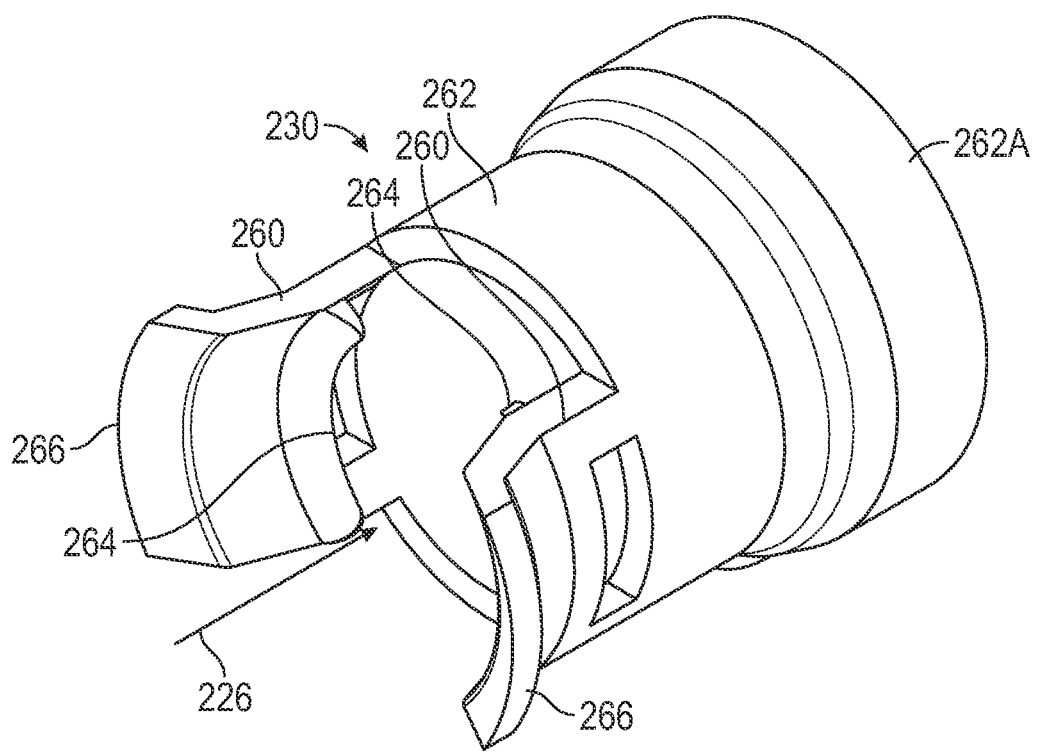
FIGS. 13A and 13B are isometric views of an adapter for the in-deck conduit of FIG. 8.
Figure 13B:
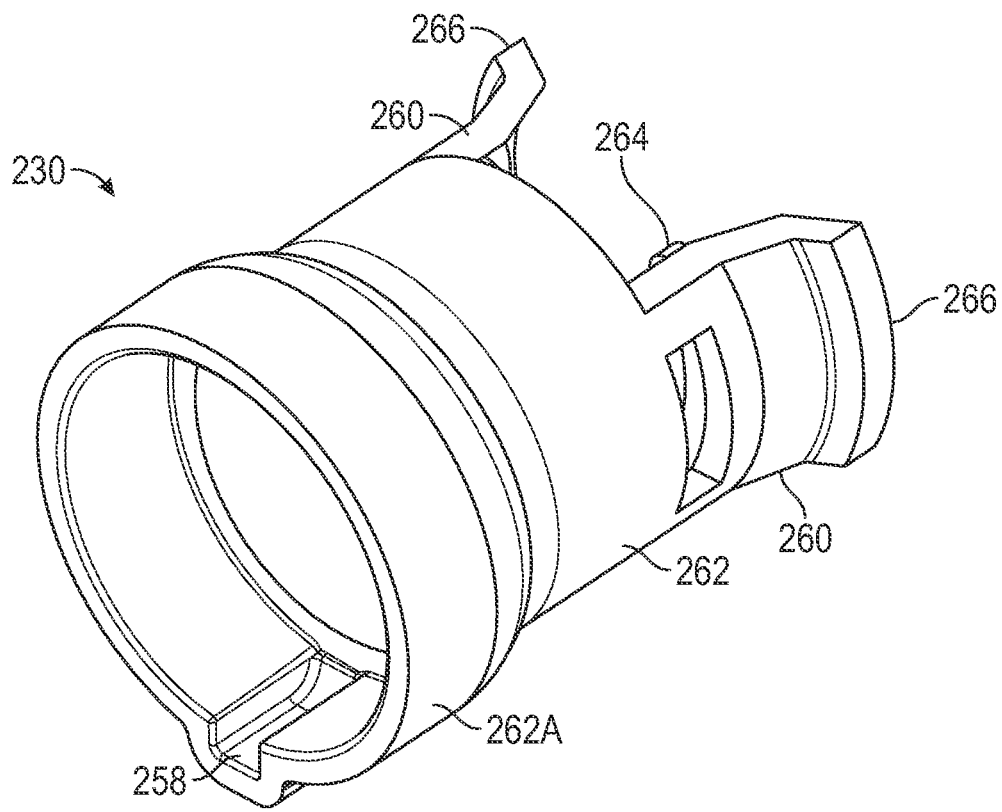

As shown in FIGS. 13A and 13B in particular, the end adapter 230 also includes integrally formed locking arms 260. The arms 260 are cantilevered from a cylindrical main body 262 that also include an expanded-diameter engagement ring 262A to receive the body 202 and secure the adapter 230 thereto (see FIG. 11A). Accordingly, with the adapter 230 installed for service, the arms 260 can flex relative to the body 202 to move into and out of engagement with a corrugated tube that has been (or is being) received into the entrance 210. In particular, two of the arms 260 are provided in the illustrated example, as can provide an optimal balance between retention strength and case of release. However, other numbers of arms can be used in some cases. Likewise, although the arms 260 as shown as substantially identical to each other and symmetrically aligned in the illustrated example, other configurations are possible.

Generally, a locking arm can include a protrusion that extends laterally inward, and a corresponding feature that extends laterally outward. The inward protrusion can be sized and shaped for engagement with recessed portions of a corrugation on a tube (from a perspective exterior to the tube) in a lateral direction. The outward extending feature can be configured to be manually (or otherwise) engaged to disengage the arm and thereby allow movement of the tube. For example, the adapter 230 includes obliquely angled catches 264 that protrude inwardly from the arms 260 (i.e., laterally inwardly, relative to the entrance direction 226). Cut-outs (as shown) or other features can provide sufficient flexibility for the arms 260 to appropriately move the catches 264 into or out of engagement with corrugated tubing, so as to secure or release the tubing, respectively, relative to the body 202. Further, to provide easier operator engagement, the arms 260 also include outwardly angled release tabs 266. Thus, as similarly discussed relative to FIG. 7, corrugated tubing can be simply pushed into the adapter 230 in the entrance direction 226, to be automatically held in place by a ratcheting operation of the arms 260, and by engagement with the catches 264 in particular. The release tabs 266 can then be manually (or otherwise) engaged, as needed, to release the tubing for further adjustment (e.g., full withdrawal from out of the conduit 200).

As also generally noted above, the in-deck conduits 20, 60, 200 may be integrally formed components, including as may be manufactured by casting, by additive manufacturing, by extrusion, or by various known types of molding. In some embodiments, the curved conduits 20, 200 or the angled conduit 60 are made of a plastic material. Although it is contemplated that the conduits 20, 60, 200 may be utilized when pouring concrete decks, the conduits 20, 60, 200 are not limited in their application to only those uses.

Thus, some embodiments of the invention can provide improved conduits for passage of wiring or other components through concrete decks. For example, some embodiments can include one or more support legs that can be arranged to provide improved stability and durability as compared to conventional designs. As another example, some embodiments can include internal geometry or external locking arms that can provide for easier installation and more reliable retention of wiring, corrugated tubing, or other components.

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values±5% of the numeric value that the term precedes.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise limited or defined, "integral" and derivatives thereof (e.g., "integrally") describe elements that are manufacture as a single piece without fasteners, adhesive, or the like to secure separate components together. For example, an element stamped as a single-piece component from a single piece of sheet metal, without rivets, screws, or adhesive to hold separately formed pieces together is an integral (and integrally formed) element. In contrast, an element formed from multiple pieces that are separately formed initially then later connected together, is not an integral (or integrally formed) element.

Also as used herein, unless otherwise defined or limited, the term "lateral" refers to a direction at least a component of which does not extend in parallel with a reference direction. Thus, for example, a "lateral" direction relative to an axial direction does not extend in parallel with the axial direction. In some cases, a lateral direction can be a radial (i.e., perpendicularly outward) direction relative to an axis that extends in a reference direction. In particular, unless otherwise specified or limited, a lateral direction in the context of a conduit with an internal passage that extends along a reference plane, is a direction that extends perpendicularly to the reference plane.

Also as used herein, unless otherwise limited or defined, "substantially parallel" indicates a direction that is within ±12 degrees of a reference direction. Similarly, "substantially perpendicular" indicates a direction that is within ±12 degrees of perpendicular to a reference direction. For a path that is not linear, whether or not the path is substantially parallel (or perpendicular) to a reference direction if an end-point to end-point line of the path is substantially parallel (or perpendicular) to the reference direction or of a mean derivative of the path within a common reference frame as the reference direction is substantially parallel (or perpendicular) to the reference direction. In this regard, "substantially horizontal" means substantially parallel to a horizontal direction and "substantially vertical" means substantially parallel to a vertical direction, with respect to gravity.

In some implementations, devices or systems disclosed herein can be utilized, manufactured, installed, etc. using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system. Thus, for example, some embodiments of the disclosed invention can include methods for manufacturing the various integrally formed (and other) components discussed above, including for the in-deck conduits 20, 60, 200 in particular.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. An in-deck conduit for installation on a form for a concrete deck, to provide a passage for wiring or other components within the concrete deck, the in-deck conduit comprising:
   a body with a base end that defines an entrance, a deck end that defines an exit, and an internal passage extending between the base end and the deck end, the entrance being oriented to receive wiring into the internal passage in an entrance direction at the deck end, and the exit being oriented to direct the received wiring out of the internal passage in a substantially vertical exit direction at the base end; and
   a leg structure extending from the deck end of the body to further support the body on the form, the leg structure providing a first support location and a second support location spaced laterally away from the entrance to define a support width that is laterally wider than the base end.

2. The in-deck conduit of claim 1, further comprising:
   an end adapter secured to the body at the entrance and including arms that extend beyond the entrance in the entrance direction, the arms including tabs that secure a corrugated tube to the body.

3. An in-deck conduit for installation on a form for a concrete deck, the in-deck conduit comprising:
   a body with a base end that defines a first opening, a deck end that defines a second opening, and an internal passage extending between the base end and the deck end, the first opening being oriented to receive wiring into the internal passage in a first direction at the deck end and the second opening being oriented to direct the received wiring out of the internal passage in a second direction at the base end;
   a base at the base end of the body to support the body on a form for a concrete deck, the base having a base width in a lateral direction, relative to the first direction; and
   one or more support legs extending from the deck end of the body in the lateral direction to support the body on the form at a first leg location and a second leg location, the first and second leg locations being spaced away from the first opening to define a support width in the lateral direction that is larger than the base width.

4. The in-deck conduit of claim 3, wherein the base is a base flange that forms an annular extension around the base end of the body.

5. The in-deck conduit of claim 3, further comprising:
   an arched gusset extending between the support legs and the body.

6. The in-deck conduit of claim 3, wherein the first direction is substantially horizontal, and the second direction is substantially vertical.

7. The in-deck conduit of claim 3, wherein the first opening includes an internal stepped profile with a first internal diameter sized to secure a first electrical conduit having a first external diameter and a second internal diameter sized to secure a second electrical conduit having a second external diameter that is smaller than the first external diameter.

8. The in-deck conduit of claim 3, wherein a centerline of the internal passage extends between the first opening and the second opening with a radius of curvature of at least 4.5 inches.

9. The in-deck conduit of claim 3, wherein the body includes an internal shoulder that defines a transition from a first internal diameter of the internal passage to a second internal diameter of the second opening, the second internal diameter being larger than the first internal diameter.

10. The in-deck conduit of claim 9, wherein second opening includes internal threads that define the second internal diameter.

11. The in-deck conduit of claim 10, further comprising:
a threaded coupler secured at the second opening and defining a coupler passage aligned with the internal passage of the body,
wherein a third internal diameter of the coupler passage is approximately equal to the first internal diameter of the internal passage.

12. The in-deck conduit of claim 3, further comprising:
a first arm that extends from a first side of the deck end of the body in a direction opposite the first direction; and
a second arm that extends from a second side of the deck end of the body in the direction opposite the first direction,
wherein one or more of the first arm or the second arm includes, respectively:
a catch that extends laterally inward, relative the first direction, to secure a tube received into the first opening; and
a tab that extends laterally outward, relative to the first direction, to be manually engaged to release the tube from the catch.

13. The in-deck conduit of claim 12, wherein, for the one or more of the first arm or the second arm, the catch and the tab are angled obliquely relative to the first direction.

14. The in-deck conduit of claim 12, wherein the body and the one or more support legs are part of an integrally formed component and the first and second arm are included on an end adapter that is selectively securable to the body at the deck end.

15. The in-deck conduit of claim 14, wherein the end adapter is secured to the body with a tongue and groove attachment structure.

16. A method for installing an in-deck conduit, the method comprising:
providing a body of the in-deck conduit, the body further including a base end that includes a base and defines a first opening, a deck end that defines a second opening, one or more support legs that extend from the deck end of the body, and an internal passage extending between the base end and the deck end,
securing the body to a concrete form including:
aligning the body so that the first opening is spaced away from the concrete form and oriented to receive wiring into the internal passage in a first direction and the second opening is adjacent to the concrete form to direct the received wiring out of the internal passage in a second direction; and
securing the one or more support legs to the concrete form at a first leg location and a second leg location, the first and second leg locations being spaced away from the first opening, relative to the first direction to define a support width in a lateral direction, relative to the first direction, that is larger than a width of the base in the lateral direction.

17. The method of claim 16, further comprising:
securing tubing to the body at the second opening with cantilevered locking arms of the body.

18. The method of claim 16, wherein securing the one or more support legs includes driving a first fastener and a second fastener through openings on the support legs.

19. The method of claim 18, wherein securing the body to the concrete form further includes:
securing the base end of the body to the form by driving a third fastener and a fourth fastener through openings on the base.

20. The method of claim 19, wherein the openings on the support legs and the base are open-ended slots that are elongate in the lateral direction.

* * * * *